United States Patent [19]

Dinbergs et al.

[11] Patent Number: 4,724,126
[45] Date of Patent: * Feb. 9, 1988

[54] INTERNALLY COATED REACTION VESSEL FOR USE IN OLEFINIC POLYMERIZATION

[75] Inventors: Kornelius Dinbergs, Broadview Heights; William S. Stebbins, Sheffield Lake, both of Ohio

[73] Assignee: The B. F. Goodrich Company, Akron, Ohio

[*] Notice: The portion of the term of this patent subsequent to Sep. 23, 2003 has been disclaimed.

[21] Appl. No.: 796,127

[22] Filed: Nov. 8, 1985

Related U.S. Application Data

[63] Continuation of Ser. No. 388,287, Jun. 14, 1982, abandoned.

[51] Int. Cl.$^4$ .......................... B01J 19/00; B01J 3/03; C08F 2/00
[52] U.S. Cl. ............................. 422/131; 526/62; 526/74
[58] Field of Search ................. 526/74, 62; 422/131, 422/241, 242

[56] References Cited

U.S. PATENT DOCUMENTS

| | | | |
|---|---|---|---|
| 3,825,434 | 7/1974 | Berens | 526/62 |
| 3,962,202 | 6/1976 | Morningstar | 526/74 |
| 4,007,320 | 2/1977 | Petersen | 526/62 |
| 4,175,100 | 3/1979 | Schilla et al. | 526/74 |
| 4,223,120 | 9/1980 | Kurowsky | 526/74 |
| 4,256,864 | 3/1981 | Cohen | 526/62 |
| 4,613,483 | 9/1986 | Cohen | 422/241 |

*Primary Examiner*—Edward J. Smith
*Assistant Examiner*—Peter F. Kulkosky
*Attorney, Agent, or Firm*—Joe A. Powell; Alan A. Csontos

[57] ABSTRACT

This invention relates to a polymerization reaction vessel having a coating on the inner surfaces thereof resulting from applying thereto an aqueous coating composition containing an unneutralized lightly crosslinked interpolymer of one or more carboxylic acid monomers with a polyunsaturated compound having a plurality of terminally unsaturated polymerizable groups whereby polymer buildup on said inner surfaces is substantially eliminated. Optionally, there is employed in the coating composition a water-soluble surfactant which contains polyether-type hydrophilic segments, such as, for example, polyoxyethylene (20) sorbitan monooleate. Multiple charges or batches of polymer can be made in said internally-coated reaction vessel without opening the same between charges, thus preventing the escape of unreacted monomer to the surrounding atmosphere.

17 Claims, No Drawings

INTERNALLY COATED REACTION VESSEL FOR USE IN OLEFINIC POLYMERIZATION

This is a continuation of application Ser. No. 388,287, filed June 14, 1982, and now abandoned.

BACKGROUND OF THE INVENTION

Various type chemical processes are commonly carried out in large, stirred vessels which are frequently provided with auxiliary equipment, such as baffles, agitator equipment, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and partially fragment resulting in contamination of the reaction mixture and the products produced therefrom. This problem is particularly prevalent in polymerization-type reactions, since the deposits, or buildup, of solid polymer on reactor surfaces not only interferes with heat transfer, but decreases productivity and adversely affects polymer quality.

The polymer buildup problem is particularly troublesome in the commercial production of polymers and copolymers of vinyl and vinylidene halides, when polymerized alone or with other vinylidene monomers having a terminal $CH_2=C<$ group, or with polymerizable polyolefinic monomers. For example, when polymerizing vinyl chloride, and other comonomers when used, the same are maintained in the form of discrete droplets in an aqueous suspension system by the use of suspending agents and agitation. When the reaction is complete, the resultant polymer is washed and dried. However, very often these suspension systems are not too stable and during the polymerization reaction, vinyl chloride polymer (PVC) builds up on the inner surfaces of the reactor. Obviously, this polymer buildup must be removed since it results in further formation of polymer buildup which, in turn, results in the formation of a hard crust. This crust formation is difficult and costly to remove.

Various methods have heretofore been proposed to reduce the amount and nature of polymer buildup on polymerization reactor surfaces, such as solvent cleaning, various hydraulic and mechanical reactor cleaners, and the like. While the various methods and apparatus have done an acceptable job, none has proved to be the ultimate in polymer buildup removal. Various coating materials have been proposed for coating the internal surfaces of the reactor which materials are resistant to polymer buildup. For example, in U.S. Pat. No. 4,080,173 there is shown and described the use of self-condensed polyhydric phenols and polyhydric naphthols as coatings to prevent polymer buildup. While these coating materials give good to excellent results, work still continues to find new and better materials with which to coat the internal surfaces of polymerization reactors.

SUMMARY OF THE INVENTION

It has been found that if a polymerization reaction vessel has been previously coated on its inner surfaces with the proper coating, undesirable polymer buildup on said surfaces can be substantially decreased, and in many cases, entirely eliminated. We have found that when the interior surfaces of a polymerization reactor are coated with an aqueous solution of an unneutralized lightly crosslinked interpolymer of one or more carboxylic acid monomers with a polyunsaturated compound having a plurality of terminally unsaturated polymerizable groups, polymer buildup on said interior surfaces is substantially eliminated. Optionally, there is employed in the interpolymer solution a water-soluble surfactant which contains polyether-type hydrophilic segments, such as, for example, polyoxyethylene (20) sorbitan monooleate. The surfactant enhances the polymer buildup resistant properties of the interpolymer.

DETAILED DESCRIPTION

In accordance with the present invention, a film or coating comprised of an unneutralized lightly crosslinked interpolymer of one or more carboxylic acid monomers with a polyunsaturated compound having a plurality of terminally unsaturated polymerizable groups, is applied to the inner surfaces of a polymerization reactor or vessel by merely contacting said surfaces with an aqueous solution of said interpolymer. Likewise, all exposed surfaces in the interior of the reactor, such as baffles, agitator, or mixing mechanism, and the like, are also treated in like manner. After the aqueous coating solution containing the interpolymer has been applied to the interior surfaces of the reactor, the polymerization medium can be introduced to the reactor and the reaction started without the necessity of drying said surfaces prior to the introduction of the polymerization medium. However, it is preferred, when after applying the coating solution to the interior surfaces of the reactor, to allow the same to set for a few minutes, but not longer than about five minutes, and then rinsing the surfaces with water, such as by spraying, or by filling the reactor with water and draining, thereby, surprisingly, leaving on said surfaces a tightly-adhering coating or film of the interpolymer which is not affected by the polymerization medium even though vigorously agitated during the polymerization reaction.

The unneutralized lightly crosslinked interpolymers useful as polymer buildup resistant coating materials in the present invention are those made from carboxylic acid monomers which contain at least one active carbon-to-carbon double bond in the $\alpha, \beta$- position with respect to a carboxyl group and have the formula

wherein R' is hydrogen or a —COOH group, and each of R" and R''' is a hydrogen or a monovalent substituent group which is linked to one of the doubly bonded carbon atoms. Carboxylic acids within this definition include acids, such as acrylic acid, wherein the double bond is terminal, such as

or the dicarboxylic acids, such as maleic acid and other anhydrides of the general structure

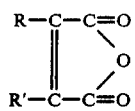

wherein R and R' are monovalent substituent groups and especially those selected from the group consisting of hydrogen and halogen groups and alkyl, aryl, alkaryl, aralkyl, and cycloaliphatic radicals.

Included within the class of carboxylic acids, shown by generic formula (1) above, are widely divergent materials, such as the acrylic acids, such as acrylic acid itself, methacrylic acid, ethacrylic acid, α- and β-chloro and bromoacrylic acids, crotonic acid, maleic acid, itaconic acid, and many others.

Polymerizable carboxylic anhydrides include any of the anhydrides of the above acids, including mixed anhydrides, and those shown by generic formula (3) above, including maleic anhydride, and others.

The preferred polymeric coating materials are those derived from polymers produced by the polymerization of the α, β- monoolefinically unsaturated carboxylic acids are those derived from the acrylic acids and α-substituted acrylic acids having the general formula

wherein R is a monovalent substituent selected from the group consisting of hydrogen, halogen, hydroxyl, carboxyl, amide, ester, lactone, and lactam.

The most preferred polymeric coating materials are those prepared from the lightly crosslinked interpolymers of acrylic acid. The crosslinking agents which may be employed with any of the carboxylic monomers, or mixtures thereof, may be any compound, not necessarily monomeric on nature, containing two or more terminal polymerizable $CH_2=C<$ groups per molecule. Examples of this class of materials include polyunsaturated-hydrocarbons, -polyethers, -polyesters, -nitriles, -acids, -acid anhydrides, -ketones, alcohols, and polyunsaturated compounds of this class incorporating one or more of these and other functional groups. Specifically, there may be utilized divinyl benzene, divinyl naphthalene, low molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bisacrylamide, methylene bis-methacrylamide, triacrylyl triazine, hexallyl trimethylene trisulfone, and many others; polyunsaturated ethers, such as divinyl ether, diallyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl polyethers containing from 2 to 7 or more of these or other alkenyl ether groupings per molecule and made from polyhydric alcohols, such as the carbohydrate sugars, and the so-called "sugar alcohols", including erythritol, pentaerythritol, arabitol, iditol, mannitol, sorbitol, inositol, raffinose, glucose, sucrose, and many others, and other polydroxy carbohydrate derivatives, the corresponding polyalkenyl silanes, such as the vinyl and allyl silanes, and others. Of this large class of crosslinking agents, the polyalkenyl polyethers of the carbohydrate sugars, sugar alcohols and other polyhydroxy carbohydrate type derivatives containing from 2 to 7 alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the polyhydroxy carbohydrate derivatives.

In the monomeric mixture, for making the unneutralized lightly crosslinked interpolymers, employed as coating materials in the present invention, the two essential monomeric materials should be present in certain proportions, although the exact proportions will vary considerably depending on the characteristics desired in the coating material, such as the extent of water-solubility desired for use as a coating material. Small amounts of the polyalkenyl polyether copolymerize quite readily with carboxylic monomers and the crosslinking effect of the polyalkenyl polyether on the carboxylic monomer is so strong that as little as 0.1% by weight thereof, based on the weight of the total mixture, produces a great reduction in the water-solubility of the resulting crosslinked polymer. When 0.1% to 2% by weight of the polyether is utilized, especially with acrylic acids, polymers are obtained which have sufficient water-solubility to form the coating solutions of the present invention. In the dual copolymer, or two-compound interpolymer, this means that the remainder of the monomeric mixture will be the carboxylic monomer.

In the coating solutions of the present invention, there may be optionally employed, along with the unneutralized lightly crosslinked interpolymers, a water-soluble polyether containing nonionic surfactant. Among the nonionic surfactants useful for the purposes of the present invention are those falling within the following generic classes: (1) polyoxyethylene alkylphenols; (2) polyoxyethylene alcohols; (3) polyoxyethylene esters of fatty acids; (4) polyoxyethylene alkylamines; and (5) polyoxyethylene alkylamides. As examples of surfactants in the above-named classes there may be named the following: polyoxyethylene (20) sorbitan monooleate, polyoxyethylene (20) sorbitan monopalmitate, polyoxyethylene (20) sorbitan monostearate, polyoxyethylene (40) stearate, polyoxyethylene (50) stearate, polyoxyethylene esters of mixed fatty and resin acids, polyoxyethylene (20) palmitate, polyethylene glycol monolaurate, polyethylene glycol monooleate, polyethylene glycol ricinoleate, polyethylene glycol monostearate, polyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) stearyl ether, polyoxyethylene (30) stearyl ether, polyoxyethylene (8) tridecyl ether, polyoxyethylene (9) nonyl phenyl ether, polyoxyethylene (21) coconut ester, and the like, etc. The above compounds have a multiplicity of functional groups and, accordingly, a very large number of modifications is possible.

In order to prevent polymer buildup in a reactor, a water-wettable surface is needed. An ordinary solid surface, such as stainless steel, for example, is not water-wettable due to the normal contamination of said surface with organic materials through contact with the atmosphere. The surface can be cleaned, such as with chromic acid, or an abrasive cleanser, such as Ajax ®, for example, and it will become water-wettable. However, this is not the full answer, since the surface will not remain in that condition for a sufficient length of time, that is, for more than the duration of a single polymerization reaction. That is to say, the surface must be recleaned after each polymerization cycle. Therefore, applying a coating to the surface which will be water-wettable and resist polymer buildup thereon and remain on said surface throughout multiple reaction cycles is more desirable.

When a metal or solid surface is nonwettable, a liquid, such as water, thereon will form droplets and not flow out into a smooth uniform film. The angle formed between the tangent of the side of the droplet and the metal or glass surface is called the "contact angle" and is expressed as "theta" ($\theta$). A further measurement of the wettability of a solid surface is the critical surface tension for wetting a solid surface and is expressed as "$\gamma c$". The $\gamma c$ is measured in dynes per centimeter. Using water as the standard, in order for a solid surface to be wettable, $\theta$ must equal 0 or be very close to it, and $\gamma c$ must be 72 dynes/cm. or greater.

It is important that the coating material being applied to the surface should not only form a wettable surface, but also form a layer or film thereon which is not readily removable. This film adheres to the solid or metal surface by adsorption and, in many cases, the film is a monolayer of the coating material applied. These films of such thickness are invisible to the naked eye. Of course, films of greater thickness can result when using higher solids content coating solutions which films or coatings are visible to the naked eye. The film or layer formed by the coating composition applied to the surface is not removable by washing with water. That is to say, the coating or film is resistant to removal from the surfaces when a turbulent aqueous reaction medium is in contact therewith, caused by the agitation of the polymerization mixture in the reactor.

The coating solutions of the instant invention are made by conventional methods, using heat and agitation where necessary. Usually a temperature in the range of about 0° C. to about 100° C. is satisfactory. Agitation during dissolution is desirable and, in some cases, necessary. It has been found that a concentration in the coating solution of the unneutralized lightly crosslinked interpolymers in the range of about 0.02% to about 2% by weight is satisfactory in accomplishing the objectives of the present invention. Preferably, the concentration will be in the range of 0.05% to about 0.7% by weight. It is to be understood, however, that since the molecular weight of the lightly crosslinked interpolymer affects the total solids content in the coating solution, the concentration of said interpolymer could, in certain instances, be greater than about 2% or less than about 0.02% by weight.

When a water-soluble, polyether containing nonionic surfactant is employed in the coating solution, with the lightly crosslinked interpolymer, it is employed in an amount in the range of about 0.01% to about 0.5% by weight, based on the weight of the coating solution. Preferably, it will be used in the range of about 0.05% to about 0.2% by weight. More importantly, the ratio of the crosslinked polymer to surfactant will be in the range of about 0.1 to about 20. It is believed that a synergistic effect occurs when the surfactant is employed in the coating solution with the crosslinked interpolymer since the polymer buildup resistance of the coating is enhanced.

The coating solutions of the present invention are usually applied to the inner reactor surfaces by spraying. However, it is also possible to apply the coating solution by flooding the reactor and then draining, or painting or brushing on, but spraying is the most practical and economical method of application. After spraying the coating solution on the inner surfaces and draining the reactor, the polymerization reaction can be started immediately without further treatment of said surfaces. However, it has been found that very good results are obtained when after applying the coating solution to the inner surfaces of the reactor, the same is left as is for a few minutes and then the coated surfaces are sprayed with water and the reactor drained prior to charging the reactor with the polymerization mixture or recipe. By a "few minutes" is meant anywhere from about 1 to 10 minutes and preferably from about 1 to 5 minutes. It should also be pointed out that the present coating works equally well on glass or metal surfaces, such as stainless steel, and the like.

The coatings of the present invention do substantially reduce polymer buildup on the reactor surfaces and what little polymer buildup, if any, that may occur, is of the "sandy" type which is of such a nature that it is readily removable from the reactor surfaces without the necessity of manual scraping procedures. In fact, sandy buildup can be removed by just rinsing with water and this can be done without opening the reactor when spray nozzles are mounted thereon. On the other hand, the polymer buildup to be avoided is what is referred to as "paper" buildup since this type of buildup is very difficult to remove and usually requires hand scraping or the use of a high-pressure jet stream of water or other liquid, which, in either case, requires the reactor to be opened, which, in turn, allows the escape of unreacted monomer, such as vinyl chloride, into the atmosphere which is hazardous.

In accordance with the present invention, multiple polymerizations may be run without opening the reactor between charges. Although multiple charges may be run without recoating the surfaces, it has been found to be expeditious to recoat the internal surfaces of the reactor after several charges (2 or 3) or after each charge to insure uniform and efficient production. With the spray nozzles mounted at strategic points on the reactor, it is possible to reach all inner surfaces thereof without opening the same. When it is decided to recoat the reactor, the reactor is drained, and the inner surfaces of the reactor are flushed with water by means of said nozzles. The coating solution is sprayed on the surfaces by means of the spray nozzles and the reactor is drained of the excess solution in such a way that the same can be sent to a recovery system, if desired. After setting for a few minutes, the surfaces are sprayed with water and the effluent is discarded, or recovered, if desired. Thereafter, the reactor is charged with the polymerization medium and the ingredients in the usual manner and the polymerization reaction commenced. It is understood, of course, that one can recoat the reactor as often as desired without opening the same, even after every charge is polymerized.

After the application of the coating composition on the interior surfaces of the reaction vessel, and spraying thereof with water, the reaction to be carried out in the equipment may be commenced immediately, no particular modification of processing techniques being required due to the presence of the coating. Further, utilization of the internally-coated reaction vessel of the present invention does not adversely affect the heat stability or other physical and chemical properties of the polymers produced therein.

For the purpose of simplicity of description, the present invention is described in terms of its use in conjunction with the suspension polymerization of vinyl chloride. It is to be understood, of course, that this is merely intended in an illustrative and not a limitative sense.

While the present invention is specifically illustrated with regard to the suspension polymerization of vinyl chloride, it is to be understood that the process and apparatus may likewise be applied in the suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $CH_2=C<$ grouping, such as acrylic acid, esters of acrylic acid, for example methyl acrylate, ethyl acrylate, butyl acrylate, octyl acrylate, cyanoethyl acrylate, and the like; vinyl acetate; acrylonitrile; methacrylic acid, esthers of methacrylic acid, such as methyl methacrylate, butyl methacrylate, and the like; styrene and styrene derivatives including α-methyl styrene, vinyl toluene, chlorostyrene; vinyl naphthalene; diolefins, including butadiene, isoprene, chloroprene, and the like; and mixtures of any of these types of monomers and other vinylidene monomers copolymerizable therewith; and other vinylidene monomers of the types known to those skilled in the art.

The present invention is particularaly applicable to the suspension polymerization of vinyl chloride, either alone or in a mixture with one or more other vinylidene monomers having at least one terminal $CH_2=C<$ grouping copolymerizable therewith in the amounts as great as about 80% or more, by weight, based on the weight of the monomer mixture, since polymer buildup in the reaction vessel is a problem here.

The polymerization process is usually conducted at a temperature in the range of about 0° C. to about 100° C. depending upon the particular monomer or monomers being polymerized. However, it is preferred to employ temperatures in the range of about 40° C. to about 70° C., since at these temperatures, polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional makeup liquid containing the monomer or monomers in the same proportions as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

In order to rate the various coatings, there has been devised a rating scale with respect to "paper" and "sandy" buildup, remembering of course, as stated hereinabove, that the paper buildup is the type that is most troublesome and to be avoided or substantially reduced or eliminated. Under the rating system, an uncoated reactor, where normal amounts of both types of polymer buildup occur, is given a rating of about 1.0 to 1.5. Any rating below this is good and below 1.0 is a definite improvement. In other words, 0.0 rating is perfect, and so on.

In order to further illustrate the present invention, the following specific examples are given. It is to be understood, however, that this is merely intended in an illustrative and not a limitative sense. In the examples, all parts and percents are by weight unless otherwise indicated.

EXAMPLE I

In this Example, three runs were made in the first of which the reactor was not coated. This was the control for comparison purposes. In Run No. 2, the reactor was coated with a 0.08% aqueous solution of polyacrylic acid crosslinked with 0.2-0.3 part/100 monomer of allyl pentaerythritol and in Run No. 3, the reactor was coated with the solution of Run No. 2 with 0.1% of polyoxyethylene (20) sorbitan monooleate added thereto. The coating solutions were made in the usual manner, using heat and agitation. Three-liter reactors, equipped with agitators and jacketed for heating and cooling, were employed. In Runs 2 and 3, the coatings were brushed on, allowed to set for approximately 5 minutes, and then rinsed with water. Thereafter, each reactor was charged with the following recipe:

Vinyl chloride: 100 parts
Water (demineralized): 118.5 parts
Hydroxypropyl methyl cellulose: 0.022 part
Polyoxyethylene (4) sorbitan, monolaurate: 0.020 part
88% hydrolyzed polyvinyl acetate: 0.008 part
Calcium phosphate tribasic: 0.030 part
Di(2-ethyl hexyl) peroxydicarbonate: 0.045 part The ingredients were charged to the reactor with the vinyl chloride being charged last. The temperature of reaction was maintained at 53° C. in each run and the reaction medium was agitated. A full reactor was used in the polymerizations, sufficient water being added to keep the reactor full. The water was added as the reaction mixture shrank because of the formation of polymer. 477 grams of water was added during each polymerization. In each case, when a pressure drop of 49 KPAS occurred, the reaction was shortstopped with a 10% solution of bisphenol A. The reactors were cooled and the contents removed in the usual manner. Thereafter, the internal surfaces of the reactors were classified in accordance with the aforementioned procedure for rating said surfaces. The results were as follows:

|  | BUILDUP RATING | |
| RUN NO. | PAPER | SANDY |
| --- | --- | --- |
| 1. Control (no coating) | 1.0 | 1.2 |
| 2. X-Linked polymer | 0.3 | 1.3 |
| 3. X-linked polyer and surfactant | 0.2 | 1.0 |

The results show the superiority of the coated reactor over the uncoated reactor.

Coating of the internal surfaces of the polymerization reactor, in accordance with the present invention, substantially reduces, and in many cases, practically eliminates polymer buildup on said surfaces during the polymerization reaction and thus results in increased production over a unit period of time. Further, the present invention enables one to operate a closed polymerization system, which, in the case of vinyl chloride polymerization, has the advantage of reducing drastically the parts per million of vinyl chloride in the atmosphere of the plant, thus meeting the recently-promulgated Governmental requirements. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

We claim:

1. A process for substantially eliminating the buildup of polymer on the internal surfaces of a polymerization reaction vessel which comprises (a) directly contacting said surfaces with an aqueous coating solution containing from about 0.02% to about 2.0% by weight of an unneutralized lightly crosslinked interpolymer of one or more carboxylic acid monomers with a polyunsaturated compound having a plurality of terminally unsaturated polymerizable groups, wherein said carboxylic acid monomer is selected from the group consisting of acrylic acid and maleic acid, and wherein the amount of said polyunsaturated compound is less than about 2.0% by weight of the weight of said carboxylic acid monomer, (b) charging the polymerization medium to the reaction vessel, and (c) conducting the polymerization of monomer(s) at a temperature in the range of about 0° to about 100° C. while in contact with the coated internal surface of said vessel.

2. A process as defined in claim 1 wherein the monomer is vinyl chloride.

3. A process as defined in claim 1 wherein the coating solution contains a water-soluble surfactant which contains polyether-type hydrophilic segments.

4. A process as defined in claim 1 wherein the interpolymer is a lightly crosslinked interpolymer of acrylic acid.

5. A process as defined in claim 1 wherein the interpolymer is polyacrylic acid crosslinked with allyl pentaerythritol.

6. A process as defined in claim 1 wherein the interpolymer is polyacrylic acid crosslinked with allyl sucrose.

7. A process as defined in claim 3 wherein the surfactant is polyoxyethylene (20) sorbitan monooleate.

8. A process as defined in claim 1 wherein, after application of said coating solution to said surfaces, the coating on said surfaces is rinsed with water prior to the start of polymerization in said vessel.

9. A process as defined in claim 8 wherein after application of said coating solution to said surfaces, the coating on said surfaces is allowed to set for approximately five minutes prior to rinsing with water.

10. A process as defined in claim 3 wherein the coating solution contains from about 0.01% to about 0.5% by weight of said surfactant.

11. A polymerization reaction vessel having in direct contact with the internal surfaces thereof a coating comprised of an unneutralized lightly crosslinked interpolymer of one or more carboxylic acid monomers selected from the group consisting of acrylic acid and maleic acid, with a polyunsaturated compound having a plurality of terminally unsaturated polymerizable groups, wherein the amount of said polyunsaturated compound usaed to crosslink said interpolymer is less than about 2.0% by weight of the weight of said carboxylic acid monomer, and wherein the coated surfaces are characterized by having a critical surface tension of at least 72 dynes/centimeter and a contact angle with water of about zero.

12. A polymerization reaction vessel as defined in claim 11 wherein the interpolymer is a lightly crosslinked interpolymer of acrylic acid.

13. A polymerization reaction vessel as defined in claim 11 wherein the interpolymer is polyacrylic acid crosslinked with allyl pentaerythritol.

14. A polymerization reaction vessel as defined in claim 11 wherein the interpolymer is a polyacrylic acid crosslinked with allyl sucrose.

15. A polymerization reaction vessel as defined in claim 11 wherein the coating contains a surfactant containing polyether-type hydrophilic segments.

16. A polymerization reaction vessel as defined in claim 15 wherein the surfactant is polyoxyethylene (20) sorbitan monooleate.

17. A polymerization reaction vessel as defined in claim 16 wherein the interpolymer is polyacrylic acid crosslinked with allyl sucrose.

* * * * *